Oct. 24, 1933.  C. DREXLER  1,931,755
TRANSMISSION
Filed Sept. 21, 1931  2 Sheets-Sheet 1

Inventor:
Charles Drexler,
By: Arthur Wm Nelson
Atty.

Oct. 24, 1933.                C. DREXLER                1,931,755
                              TRANSMISSION
                          Filed Sept. 21, 1931          2 Sheets-Sheet 2

Inventor:
Charles Drexler,
By: Arthur Wm Nelson
Atty.

Patented Oct. 24, 1933

1,931,755

UNITED STATES PATENT OFFICE 1,931,755

TRANSMISSION

Charles Drexler, Indianapolis, Ind., assignor to L. G. S. Devices Corporation, Indianapolis, Ind., a corporation of Indiana Application September 21, 1931
Serial No. 563,942

11 Claims. (Cl. 74—59)

This invention relates to improvements in transmissions and it consists of the matters hereinafter described and more particularly pointed out in the appended claims.

The primary object of the invention is to provide a transmission for automotive vehicles having the usual shiftable gears for the various forward speeds and reverse and which includes means operative in all forward speeds to give a free wheeling action when desired, said means operating to automatically lock-out such action when going into reverse, there being additional means whereby such action may be locked-out in said forward speeds so that the transmissions may be operated in the manner of a conventional non-free wheeling transmission.

A further object of the invention is to provide a free wheeling transmission in which reverse drive is possible, merely by shifting into reverse in the conventional manner, and this regardless of whether the elements permitting free wheeling are in or out of that position providing the same, the improved transmission being devoid of any mechanism or device requiring manipulation before said reverse drive can be obtained.

Another object of the invention is to provide, in a transmission of this kind, a free wheeling mechanism including cooperating clutch members and a clutch element, and which members may be locked together by a shiftable collar independent of said element, the collar being so formed that when in free wheeling position, it is engaged by the reverse gear when shifted to provide reverse, and which reverse gear then drives around the free wheeling mechanism to the driven shaft, without a shifting movement of the collar.

Another object of the invention, as well as the many advantages thereof, will more fully appear as I proceed with my specification.

In the drawings:—

Figure 1:
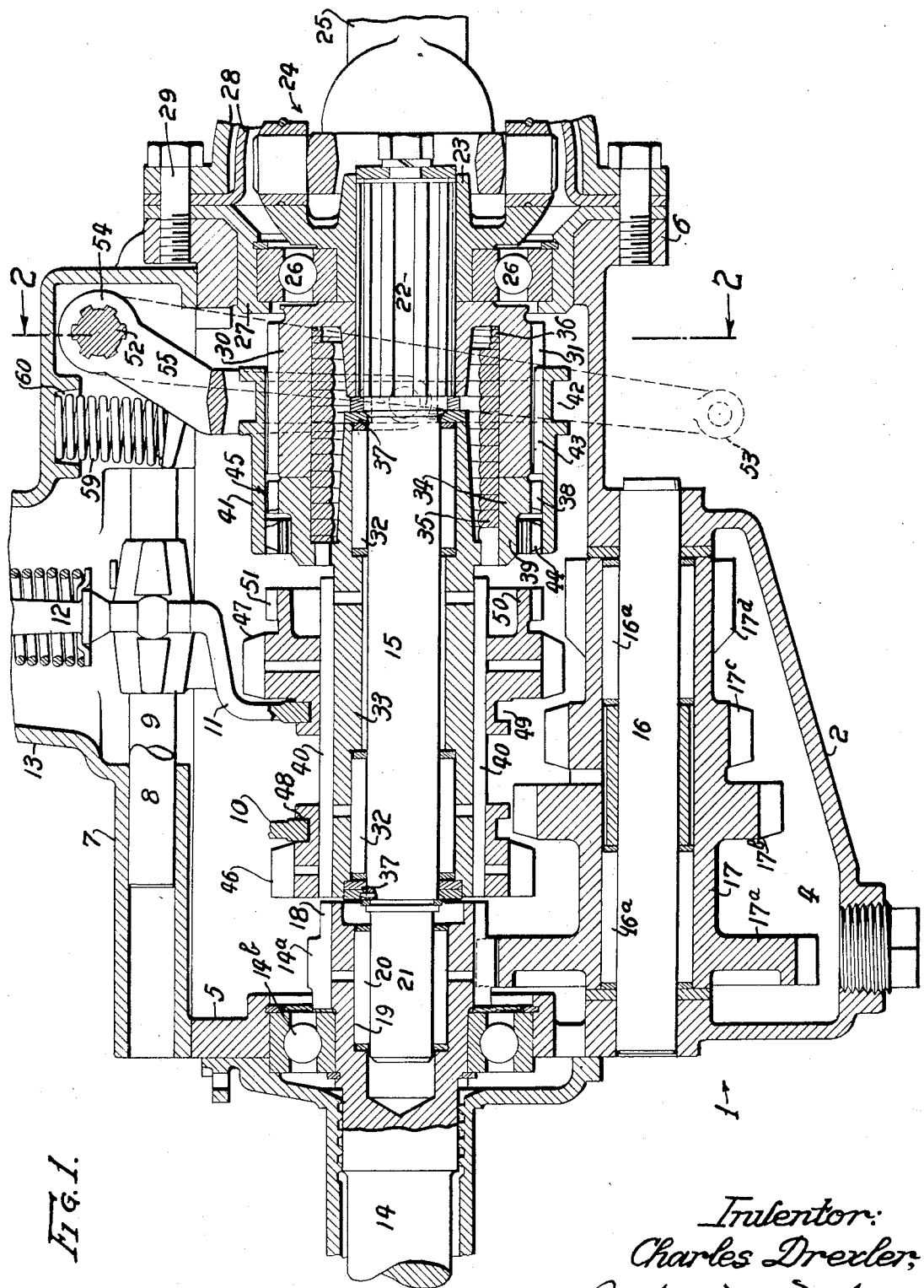
Fig. 1 is a longitudinal vertical sectional view through an automotive transmission embodying my invention.
Figure 2:
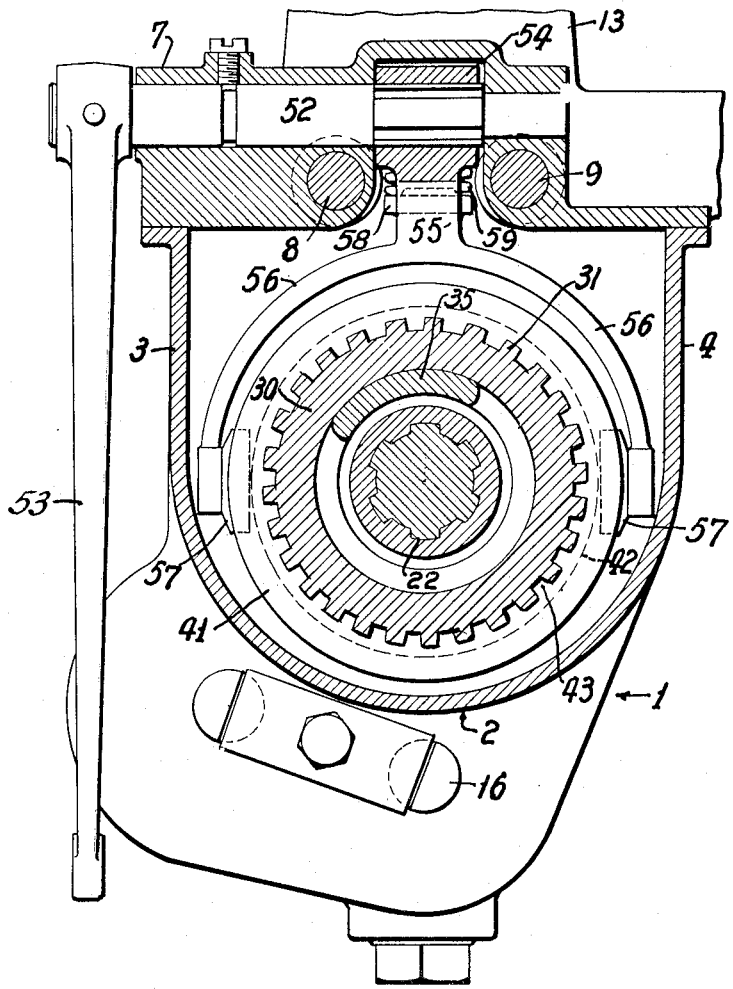
Fig. 2 is a transverse vertical sectional view through the same as taken on the line 2—2 of Fig. 1.

In general, my improved transmission includes a drive shaft (which is engine driven through the usual clutch), a driven shaft (to which the propeller shaft is connected) and the usual countershaft. This latter shaft has journalled thereon a sleeve embodying a plurality of longitudinally spaced, stepped-down gears, one of which is in constant engagement with a gear on the drive shaft. Another one of these gears meshes with an idler gear in the usual manner of transmissions of this kind.

On the driven shaft is fixed a clutch member and journalled on said shaft is an externally splined sleeve including a clutch member at one end to coact with the first mentioned clutch member to enclose a clutch element in the form of a coiled spring. Both clutch members are externally splined and shiftable thereon, is an internally splined collar which when shifted rearwardly, positively connects the two clutch members together independent of said clutch element to provide the "lock-out" for the clutch as a whole.

On the externally splined sleeve before mentioned, are two shiftable gears, one of which when so shifted meshes with gears on the countershaft sleeve to provide second (or intermediate) and third (or high) speed forward for the transmission. The other gear when so shifted meshes either with a third gear on the countershaft sleeve to provide first (or low) speed forward or with the idler gear before mentioned to provide reverse. In the shifting of said other gear to provide reverse, it so engages the associated end of the collar as to positively connect the externally splined sleeve to the clutch member fixed on the driven shaft. When said last mentioned gear is shifted back into neutral, it leaves said sleeve in a position automatically re-establishing free wheeling action unless the sleeve is actuated by other means provided therefor to lock-out said clutch in all forward speeds.

Referring now in detail to that embodiment of the invention, illustrated in the accompanying drawings:—1 indicates as a whole the open top casing of the transmission which includes a bottom wall 2, left and right hand side walls 3 and 4 respectively and front and rear end walls 5 and 6 respectively. Associated with the casing and closing the open top thereof is a cover 7 secured to the casing in any suitable manner. In said cover are the longitudinally extending shift rods 8 and 9 respectively each carrying a yoke 10 and 11 respectively, only a portion of the rod 8 and associated yoke 10 being shown in Fig. 1. These shift rods are adapted to be selectively engaged by the bottom end 12 of the usual shift lever which as in transmissions of this kind has a ball and socket engagement in a hollow cone-like housing 13 rising from the cover about midway between its ends.

When the shift lever 12 has been manipulated to selectively engage either yoke 10 or 11 the associated rails or rods may be shifted longitudinally in either direction. The shift rod 8 is for the second and high gear for the transmission while the shift rod 9 is for the low and reverse gear for the transmission.

14 indicates the drive shaft of the transmission adapted for connection with the engine (not shown) in any suitable manner, 15 indicates the coaxially disposed driven shaft of the transmission and 16 indicates the associated countershaft of this transmission. The countershaft which is fixed at its ends in the casing has journalled thereon by means of suitable roller bearings 16a, a countershaft sleeve 17 that is formed to provide longitudinally spaced, stepped-down gears 17a, 17b, 17c and 17d respectively in the order named, the last mentioned gear meshing with the usual idler gear (not shown herein). The shaft 14 is journalled near its rear end in an antifriction bearing 14b supported in the front end wall of the casing and just to the rear of said bearing said shaft is formed to provide a gear 14a. The rear end part of said gear is turned down to provide spline teeth 18 and in the rear end of said shaft is an axial recess 19 containing a roller bearing 20 in which the reduced front end portion 21 of the driven shaft is journalled.

The driven shaft 15 has an externally splined rear end part 22 of a somewhat enlarged diameter to which is secured the hub 23 on one part of a universal joint 24 by means of which the driven shaft is operatively connected to the propeller shaft 25 of the automotive vehicle in which the transmission is installed. The hub 23 of said part of said universal joint is journalled in an antifriction bearing 26 engaged in a collar 27 that is secured in an opening provided therefor in the rear wall 6 of the casing 1. The collar 27 together with parts 28 that provide an enclosure for the universal joint, are bolted to the said rear wall of the casing as indicated at 29.

Just forward of the hub 23 and bearing 26, is a forwardly facing cup-like clutch member 30 having a hub that has a splined engagement on the part 22 of the driven shaft 15. This clutch member overhangs a part of the shaft 15 forwardly of its splined rear end part and is externally splined as at 31.

Journalled on the mid portion of the driven shaft 15 between its end portions 21 and 22 before mentioned by means of longitudinally spaced roller bearings 32, is a sleeve 33 that is formed at its rear end with a rearwardly facing cup-like clutch member 34. This clutch member coacts with the clutch member 30 to provide a chamber for a clutch spring 35 including an energizing end 36. This spring has a toed connection at one end with one of said clutch members and upon a relative rotation of said clutch members in one direction, said spring is unwound to radially expand and connect said two clutch members together. In a relative rotation of said clutch members in the other direction, the spring is caused to radially contract and to release its gripping action so that one of said clutch members overruns the other and provides that action now known as "free wheeling". Suitable thrust bearings 37 are provided at the ends of said sleeve 33 which prevent undesired endwise shift of said sleeve.

The rear end part of the clutch member 34 is provided with relatively short external spline teeth 38 that match the teeth 31 on the clutch member 30 and just forwardly of the teeth 38, the clutch member 34 is externally turned down to provide an annular reduced portion 39. The sleeve 33 is provided for its entire length forward of the clutch member 34 with external spline teeth 40 that match those spline teeth 18 on the rear end of the drive shaft.

Associated with and surrounding as well as longitudinally shiftable on the clutch members 30 and 34 is a sleeve 41 which is of an axial length approximating the combined length of the external spline teeth 31 and 38 of said clutch members. Said collar is provided at its rear end with an annular groove 42 and is provided with sets of rear and front, internal spline teeth 43 and 44 respectively. The spline teeth 43 are of a greater axial length than the teeth 44 and are spaced therefrom as indicated at 45.

When the collar 41 has been shifted forwardly, the external teeth 38 of the clutch member 34 are disposed in the space 45 between the teeth 43 and 44 of said collar as best shown in Fig. 1. When said collar has been shifted rearwardly, then its spline teeth 44 engage with the spline teeth 38 of the clutch member 34 and this positively connects the two clutch members together, independent of the clutch element or spring 35. The means for so shifting said collar will soon be described.

Longitudinally shiftable upon but rotative with the sleeve 33 are two gears 46 and 47 respectively the former constituting the second and third speed forward gear and the latter constituting the first speed forward and reverse gear. Both of these gears are internally splined to engage the external spline teeth 40 on said sleeve. The gear 46 which when in a neutral position, stands in a plane between the gears 17a and 17b on the countershaft, is provided in its rear end with an annular groove 48 in which the yoke 10 before mentioned engages.

The gear 47 which when in its neutral position stands in a plane between the gears 17c and 17d on the countershaft, is provided in its forward end with an annular groove 49 in which the yoke 11 before mentioned engages. On the rear end of said gear 47 is provided an annular flange 40 of an inside diameter permitting it to take the reduced front end part 39 of the clutch member 34 and on this rear end of said flange are external spline teeth 51, that match those on both clutch members 30 and 34 respectively.

To impart longitudinal shifting movement to the lock-out collar 41 before mentioned, I provide the following construction:—

Figure 3:
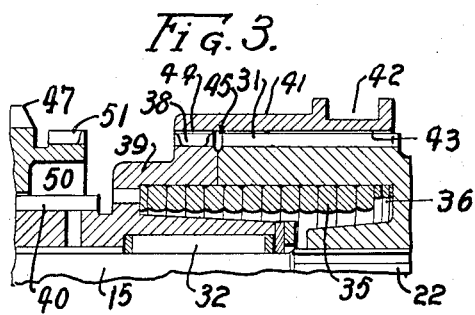
Fig. 3 is a detail sectional view of parts of the overrunning clutch and shift collar along with a part of the first speed forward and reverse gear, when said collar has been shifted rearwardly from the position shown in Fig. 1 to lock out the clutch.

In the rear end of the cover 7 is journalled a transverse rock shaft 52 and to that end thereof projecting beyond the left hand side wall 3 of the casing is secured a depending lever arm 53. This lever arm is preferably actuated by means of a Bowden wire and tube (not shown) operable from a point convenient for the driver in the manner well-known. Splined to the mid portion of said shaft is the hub 54 of a depending yoke 55 and which includes yoke arms 56 that straddle the collar 41 and carries pads 57 that engage in diametrically opposite sides of the groove 42 in said collar. Said yoke is provided at a point between its hub and arms with a forward extension 58 that is engaged by the bottom end of a spring 59, the top end of which engages in a pocket 60 in the underside of the cover plate 7. This spring so acts upon said extension as to normally swing said yoke counterclockwise as shown in Fig. 1 so as to shift the collar 41 rearwardly into the position shown in Fig. 3 wherein said collar locks the two clutch members 30 and 34 positively together independent of the clutch spring. It is apparent that when the Bowden wire and tube before mentioned, is manipulated in the proper manner that it will through the arm 53 swing the yoke clockwise into the position shown in Fig. 1 and will hold it in this position, independent of the spring 59.

The various parts of the transmission are shown in neutral position in Fig. 1 and the collar 41 is in that position permitting free wheeling, having been moved into said position by the lever 53 and yoke 55 against the action of the spring 59 which is now somewhat compressed.

With the shaft 14 being engine driven, it is apparent that the gear 14a thereon is driving the sleeve 17 on the countershaft. To provide first speed forward the lever 12 is actuated to select the shift rod 9 and impart a forward movement thereto. Through the yoke 11, the gear 47 is shifted forwardly on the splined sleeve 33 into engagement with the gear 17c on the countershaft sleeve so that the sleeve 33 and its associated clutch member 34 is driven thereby. With said clutch member rotating relatively to the clutch member 30 (splined on the driven shaft) the clutch spring 35 tends to unwind and radially expand to clutch the clutch members together and thus drive the driven shaft 15 through the clutch. Should the shaft 15 be driven at a speed greater than that of the sleeve 33, as when the engine is decelerated and the automobile is travelling under momentum, then the clutch member 30 tends to wind up and radially contract the spring which releases its gripping action. This permits the clutch member 30 to overrun the clutch member 34 to give that action now known as "free wheeling".

In going into second speed forward, the lever 12 is actuated to return the gear 47 to neutral and then said lever is further actuated to drop the yoke 11 and select or pick up the yoke 10. The lever is then shifted to impart a rearward movement to the gear 46 to engage the same with the countershaft gear 17b so that the sleeve 33 is driven therethrough. With the sleeve thus driven the associated clutch member will act as before described to cause the spring 35 to clutch the two clutch members together so that the driven shaft 15 is being driven in second speed forward through the overrunning clutch.

To provide third speed forward, the lever 12 is actuated to shift the gear 46 out of engagement with the countershaft gear 17b forwardly so that the internal spline teeth of said gear 46 engage the spline teeth 18 on the rear end of the drive shaft 14. This connects the sleeve 33 directly to the drive shaft which sleeve through its clutch member 34 actuates the spring 35 to clutch said member to the clutch member 30.

Thus in each of the forward speeds mentioned, the drive to the shaft 15 is through the overrunning clutch so that free wheeling is possible in each of these forward speeds. Should it be desired to lock-out this free wheeling action in all of said forward speeds, the lever 53 is released from the holding action afforded through the Bowden wire and tube by which it was manipulated. Upon such release of said lever, the spring 59 will act to expand and will through the yoke extension 58 swing the yoke counterclockwise from the position shown in Fig. 1 and thus shift the collar 41 rearwardly into the position shown in Fig. 3. In this position, the internal spline teeth 44 at the front end of said sleeve will engage the external spline teeth 38 of the clutch member 34 and the internal spline teeth 43 of said collar will engage the external spline teeth 31 of the clutch member 30 and thus positively connect said clutch members together independent of the clutch spring. To again provide free wheeling, the lever 53 is actuated to rock the shaft 52 and swing the yoke 55 clockwise to shift the collar 41 into the position shown in Fig. 1.

Figure 4:
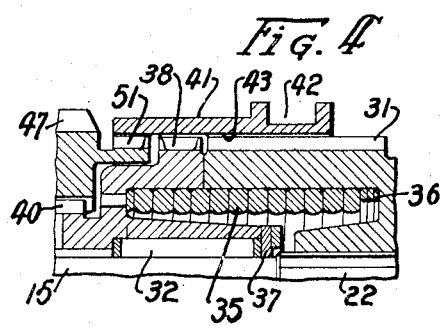
Fig. 4 is a view similar to Fig. 3 with the shift collar shown in the same position as in Fig. 1 but with the reverse gear in its rearward shifted position and operating in this position to lock-out the clutch.

Assume that the parts are in the neutral position shown in Fig. 1 and that it is desired to go into reverse. The lever 12 is shifted to select the yoke 11 and then is actuated to shift said yoke rearwardly. This will shift the gear 47 rearwardly so that the flange 50 will slip over the reduced part 39 of the clutch member 34 and the spline teeth 51 on the rear end of said gear will engage the internal spline teeth 44 on the front end of the collar as best shown in Fig. 4. In this rearward shift of said gear, it will engage the idler gear before mentioned, as meshing with the gear 17d on the countershaft gear so that the gear 47 is driven in a reverse direction. As the gear 47 is now positively connected to the collar 41 which through its teeth 43 is positively connected to the clutch member 30, it is apparent that the shaft 15 is driven in reverse. Should the collar 41 happen to be in the lock-out position shown in Fig. 3 and it is then desired to go into reverse, the lever 12 is manipulated to shift the gear 47 rearwardly so that it meshes with the idler as before described. At this time, the flange 50 will slip over the reduced part 39 of the clutch member 34 and as the collar 41 is all ready positively connecting the clutch members together, and as the gear 47 has the splined connection with the sleeve 33, the drive will be through the gear 47 to the sleeve 33 and through its clutch member 34 to the collar 41 and then to the other clutch member 30.

Thus no matter what position the lock-out collar happens to be in, when the gear 47 is shifted to provide reverse, the clutch is positively locked-out. Should the collar happen to be in free wheeling position, this action is locked-out in going into reverse and upon going out of reverse said free wheeling action is restored.

While in describing the invention, I have referred in detail to the form, arrangement and construction of the parts thereof, the same is to be considered as illustrative only, so that I do not wish to be limited thereto except as may be specifically set forth in the appended claims.

I claim as my invention:—

1. A transmission embodying therein a driven shaft, a free wheeling clutch associated therewith and including coacting clutch members and an associated clutching means, means for locking out said clutching means, means for driving the driven shaft in one direction through one of said clutch members and means adapted to be operatively engaged with said lockout means for driving the driven shaft in the other direction through the other clutch member.

2. A transmission embodying therein a driven shaft, a free wheeling clutch associated therewith shiftable lockout means for said clutch, means shiftable in one direction to provide a forward drive for the driven shaft through said clutch, said means also being shiftable in the other direction to operatively engage and transmit power through said lockout means without shifting the same to provide a reverse drive for said shaft.

3. A transmission embodying therein a driven shaft, a free wheeling clutch associated therewith and comprising coacting clutch members and an associated clutching means, shiftable means for locking said clutch members together independent of said associated clutching means, means for driving said shaft through the clutch in one direction and means for driving the shaft in the other direction comprising a driven element movable into engagement with and transmitting power through said means for locking the clutch members together and one of said clutch members.

4. A transmission embodying therein a driven shaft, a free wheeling clutch comprising coacting clutch members and an associated clutching means, means for locking out said clutching means, one of said clutch members being fixed to said shaft and the other being rotative thereon, means for driving said shaft in one direction through said clutch and means movable to operatively engage said lockout means to transmit power therethrough for driving said shaft in the other direction, through the clutch member fixed to said shaft.

5. A transmission embodying therein a driven shaft, a clutch member fixed thereto, a second clutch member loose with respect thereto and means coacting with said clutch members when relatively rotated in one direction to clutch them together, a shiftable collar for locking said clutch members together independent of said coacting means and a gear for driving said shaft in either forward or reverse, said gear being engageable with said collar to transmit power therethrough in driving said shaft in reverse.

6. A transmission embodying therein a driven shaft, a free wheeling clutch associated therewith and comprising a clutch member fixed to said shaft, a clutch member loose on said shaft and coacting clutch means, a collar shiftable on said clutch to lock the same in or out of operation and a gear for driving said shaft through said clutch in a forward direction, said gear being engageable with the collar to transmit power therethrough to drive said shaft in reverse when said collar is out of lock-out position.

7. A transmission embodying therein a driven shaft, a free wheeling clutch associated therewith and comprising a clutch member fixed to the shaft, a second clutch member loose on the shaft and coacting clutch means, a lock-out collar associated with said clutch members and a gear shiftable on but rotative with the clutch member loose on said shaft, said gear being shiftable into engagement with said collar when out of lock-out position to drive said shaft through the same and the clutch member fixed on said shaft.

8. A transmission embodying therein a driven shaft, a free wheeling clutch associated therewith and comprising a clutch member fixed to the shaft, a second clutch member loose on the shaft and coacting clutch means, said gear loose on the shaft including a splined hub, a lock-out collar associated with said clutch members and a gear shiftable on the splined hub of the clutch member loose on said shaft to drive said shaft in one direction through said clutch members and clutching means and to drive said shaft in the other direction through said collar and the clutch member fixed to said shaft when said collar is out of locking position.

9. A transmission embodying therein, a drive shaft, a countershaft driven thereby and a driven shaft, a free wheeling unit comprising a clutch member fixed to the driven shaft, a second clutch member rotative thereon and an associated clutching means, said second clutch member having a splined hub, a lock-out collar shiftable of the clutch, a gear shiftable on said splined hub into position to be driven in forward or reverse from the countershaft, said gear when shifted to provide reverse also being engageable with the said collar when out of lock-out position to drive said shaft in reverse.

10. A transmission embodying therein a drive shaft, a countershaft including gears driven thereby and a driven shaft, a free wheeling unit comprising a clutch member fixed to the driven shaft, a second clutch member rotative thereon and an associated clutching means, said second clutch member having a splined hub, a lock-out collar shiftable of the clutch, a gear shiftable on said splined hub to engage certain gears on the countershaft to provide two different forward speeds for the driven shaft and a second gear also shiftable on said splined hub to provide a third forward speed and reverse for the driven shaft, said second gear when in that position providing the third speed forward for the driven shaft, driving the same through said clutch members and when in that position providing reverse for said driven shaft, driving the same through said collar and the clutch member fixed on said shaft.

11. A transmission embodying therein a driven shaft, a free wheeling clutch associated therewith and comprising coacting clutch members and an associated clutching element, means for locking-out the clutch and movable into and out of lock-out position a gear shiftable with respect to one of said coacting clutch members for driving said shaft in either forward and reverse, said gear when shifted in a direction operating to drive said shaft in reverse either through one of clutch members and collar when the latter is in lock-out position said gear when shifted in the other direction operating to drive through both of said clutch members when the collar is out of lock-out position.

CHARLES DREXLER.